United States Patent
Armstrong

[15] 3,661,686
[45] May 9, 1972

[54] TRANSPARENT LAMINATED STRUCTURE OF REDUCED SPECULAR REFLECTANCE

[72] Inventor: Ramsey C. Armstrong, Pacific Palisades, Calif.

[73] Assignee: The Sierracin Corporation, Sylmar, Calif.

[22] Filed: Apr. 27, 1967

[21] Appl. No.: 634,297

[52] U.S. Cl..........................161/2, 117/35, 117/71, 117/211, 161/3.5, 161/4, 161/119, 161/409, 350/164, 350/278
[51] Int. Cl..........................G02b 1/10, G02b 5/26
[58] Field of Search..........................161/2, 3.5–4, 119–120, 161/196, 199, 215, 409; 117/35, 71, 124 B, 124 C, 211, 213, 217–218; 350/276–278, 164, 1; 156/153–154

[56] References Cited

UNITED STATES PATENTS

| | | |
|---|---|---|
| 1,887,144 | 11/1932 | Wilczynski..........................350/278 |
| 2,131,039 | 9/1938 | Draeger..........................161/3.5 |
| 2,640,904 | 6/1953 | Gaiser..........................161/196 X |
| 2,676,117 | 4/1954 | Colbert et al...................161/409 X |
| 3,069,301 | 12/1962 | Buckley et al..................161/199 X |
| 2,900,271 | 8/1959 | MacIntyre et al................117/33.5 |
| 3,389,029 | 6/1968 | Forman et al..................161/6 X |

Primary Examiner—John T. Goolkasian
Assistant Examiner—R. A. Killworth
Attorney—Lyon and Lyon

[57] ABSTRACT

A laminated structure, transparent or adapted to be made transparent, having an intermediate layer of reflective material following the contours of the roughened surface of a first layer, thus reducing the specular reflectance and mirror-like imaging properties of the intermediate layer, and a thermoplastic layer disposed next to the intermediate layer with the surface of said layer adjacent the intermediate layer following the contours thereof.

14 Claims, 6 Drawing Figures

Patented May 9, 1972  3,661,686
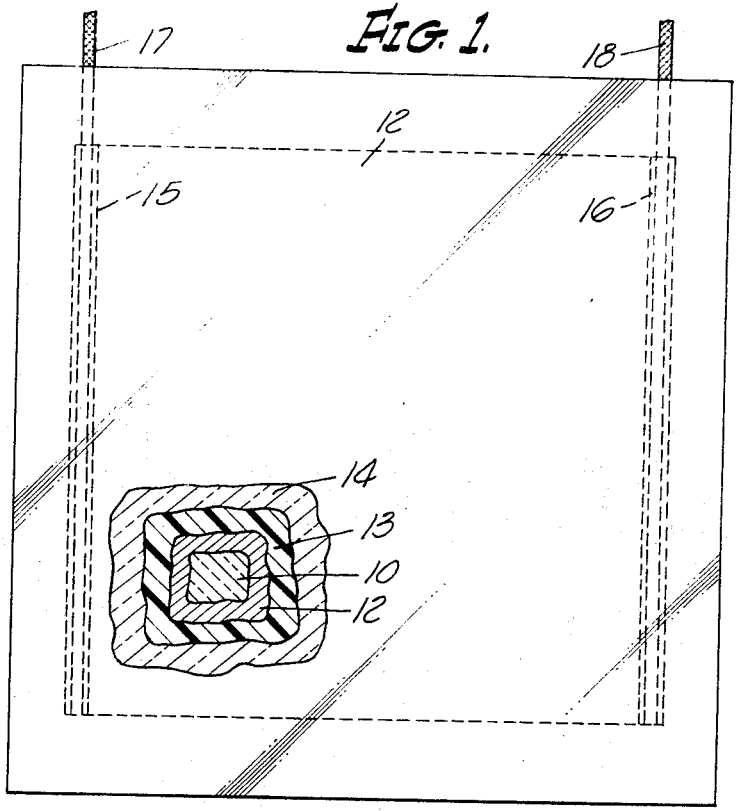
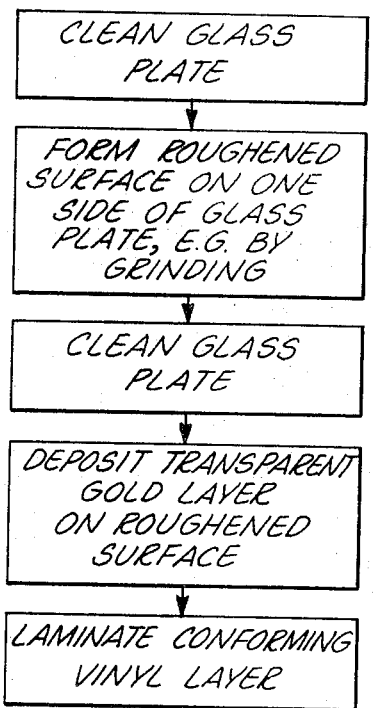
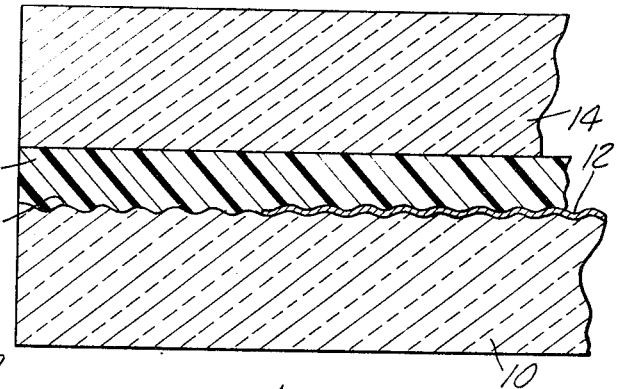
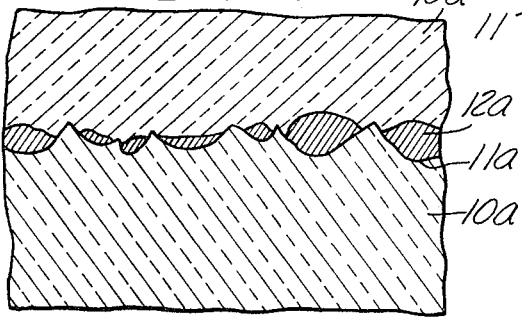
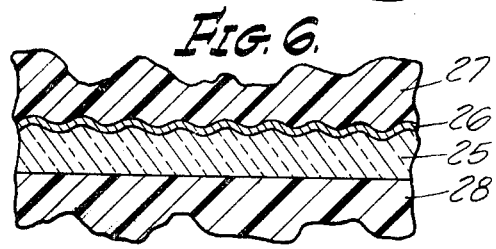
INVENTOR.
RAMSEY C. ARMSTRONG
BY Lyon & Lyon
ATTORNEYS

TRANSPARENT LAMINATED STRUCTURE OF REDUCED SPECULAR REFLECTANCE

BACKGROUND OF THE INVENTION

Transparent laminated structures having a thin intermediate layer of metal, metal oxide, or similar substances have been provided in the past for various applications. For example, architectural glass has been made available which is of a laminated construction in which a thin, transparent intermediate layer of metal is deposited on a transparent substrate such as clear glass or plastic and then covered with a protective coating such as another sheet of glass or plastic. The purpose of the intermediate metal layer in such glass is to reject infrared radiation in order to reduce the radiant heat energy transmitted into a building interior. Somewhat similar laminated structures used for aircraft or automobile windshields are provided with means for passing an electrical current through the metal layer to heat the laminated structure for defogging or deicing purposes. Such laminated structures can be flexible or inflexible, and they are also used in such other diversified applications as welders' or astronauts' masks, infrared rejecting window shades, transparent radio frequency shielding panels, burglar-proof windows, and radar reflecting panels. As used herein, the term "transparent" means having the property of transmitting light without appreciable scattering so that bodies lying beyond are entirely visible.

While such laminated structures are satisfactory in many respects, they have one major drawback; namely, the intermediate layer acts as a partial mirror and specularly reflects, thus producing images. This image reflection can be annoying, distracting, or even dangerous to those who are subjected to it. For example, when such a laminated structure is used for architectural glass, at night when the interior of the building is much more brightly lighted than the exterior, the laminated structure acts essentially as a one-way mirror and prevents those inside the building from seeing out while permitting those outside to view the occupants. Also, the occupants may be bothered by reflected images of themselves and other objects within the building. During the daytime, a reflected image of the sun may be directed into the eyes of the passing motorists thus creating a safety hazard.

When such a laminated structure is used for a windshield, the reflected images of panel lights or other lights within the vehicle are distracting to the occupants. The internal image reflection problem is magnified in masks or face pieces such as those worn by welders or astronauts, because the inner surface of such masks tend to focus any light intruding behind the mask causing images which distract the wearer. This image reflection problem is also present to a greater or lesser degree in the various other applications in which laminated structures having an intermediate layer of metal or other reflecting material is present.

SUMMARY OF THE INVENTION

According to the present invention, a transparent laminated structure, or a laminated structure for inclusion in such a structure, is provided which greatly reduces specular reflections so as to substantially eliminate the mirror-like images which occur when presently available structures of somewhat similar construction are utilized. The laminated structure of the present invention is thus acceptable for use in a number of applications in which the prior art structures because of their reflection characteristics were not satisfactory.

The reduction in specular or mirror-like image reflection is produced by forming a matte or roughened surface on a substrate prior to the deposition of the metallic layer thereon. Thus, when the metallic layer is deposited, it will not be smooth but, because it tends to conform to the contours of the roughened surface of the substrate, will be rough and will therefore diffuse the visible reflectance and therefore considerably reduce specular reflection and imaging. In order to eliminate the light scattering effect of the rough surface of the metallic layer on transmitted visible light, this surface is covered with a transparent layer which on the surface adjacent to the metallic layer follows the contours thereof and on the other surface re-establishes a smooth surface of the desired configuration, for example, a smooth flat surface if a flat or planar structure is desired.

As used herein, the terms "rough" and "roughened" are used in a broad sense to denote that a surface is provided with a plurality of peaks and depressions. The terms are not intended to imply exclusively any particular pattern or configuration of the surface such as jagged or smoothly undulating peaks and depressions but are rather meant to encompass all such configurations. The term "specular reflection" as used herein means the mirror-like reflection of light.

It is therefore an object of the present invention to provide a transparent laminated structure including an intermediate layer having different optical properties from the adjacent layers but in which objectionable specular reflectance from the intermediate layer is substantially reduced.

It is another object of the present invention to provide a laminated structure through which the clarity of the view is preserved but which greatly diffuses the light reflected from an intermediate layer.

It is also an object of the present invention to provide a laminated structure, including an intermediate layer having different optical properties from the adjacent layers, for inclusion in a transparent laminated structure but in which objectionable specular reflectance from the intermediate layer is substantially reduced.

It is a further object of the present invention to provide a process for fabricating such a transparent laminated structure.

It is yet another object of the present invention to provide a process for fabricating such a laminated structure for inclusion in a transparent laminated structure.

BRIEF DESCRIPTION OF THE DRAWING

FIG. 1 is a top plan view, partly broken away, of an electrically conducting laminated structure according to the invention;

FIG. 2 is an enlarged sectional detail of the structure in FIG. 1;

FIG. 3 is an enlarged sectional detail of a generalized laminated structure according to the present invention;

FIG. 4 is a flow diagram of a process by which laminated structures according to the present invention may be produced;

FIG. 5 is a sectional view of another embodiment of the present invention; and

FIG. 6 is a sectional view of a third embodiment of the present invention.

DESCRIPTION OF THE INVENTION

Turning now to FIGS. 1 and 2 there is shown a laminated structure constructed in accordance with the present invention. It is to be understood that these figures are illustrative only and are not to be considered as drawn to scale. The structure comprises a substrate 10 of transparent glass or plastic which is provided with a roughened upper surface 11. A thin layer 12 of a reflecting material such as metal is then formed on the roughened surface by any suitable conventional technique, such as vacuum deposition. As can be seen in FIG. 2, the layer 12 follows the contours of roughened surface 11 so that the layer 12 is, like the surface 11 itself, rough and has peaks and depressions. It is necessary that both surfaces of the layer 12 be rough; however, only the adjacent surface of layer 12 need conform to surface 11. It is not intended that the rough layer 12 is meant to be of uniform thickness or that the surface of layer 12 remote from the roughened surface 11 exhibit precisely the same pattern or configuration as the roughened surface 11. Furthermore it is not intended that the layer 12 must cover all the peaks or jagged irregularities of the surface 11, but, rather, need cover only a sufficient portion of surface 11 so that the specific purpose or function of layer 12 in the total configuration is accomplished.

FIG. 3 is a sectional view of a more generalized laminated structure which embodies the invention. In this figure it is seen that the roughened surface 11a of the substrate penetrates in several regions the entire layer 12a; that is, the layer 12a as shown does not cover all the peaks of the roughened surface 11a. Thus the layer 12a exhibits local discontinuities or voids, but for this purpose is considered to follow the contours of surface 11a. Furthermore it is to be noted that the surface layer 12a which is adjacent to the surface 11a is rough and follows the contours of surface 11a at all points where the juxtaposition of these two surfaces forms a boundary. Thus the surface of layer 12a adjacent to surface 11a, being rough, acts to diffuse reflected light and, hence, greatly reduces specular reflections. Moreover, the surface of layer 12a which is remote from surface 11a is also rough, but is not necessarily of the same pattern or configuration as the surface of layer 12a which is adjacent to surface 11a. The rough quality of the surface of layer 12 a remote from surface 11a is largely determined by the roughness of the layer 11a, but is affected also by the type of deposit which constitutes the layer 12a, the temperature of the substrate during deposition, and the manner of deposition. Nevertheless, the surface of layer 12a remote from surface 11a, being rough, also acts to diffuse reflected light and, hence, greatly reduces specular reflections. The construction therefore shows that both surfaces of layer 12a, though not of the same pattern, are rough and that the structure reduces specular reflectance of light incident upon either side of layer 12a. Layer 13a is shown conformed to the outermost surface of layer 12a and, in this case, also to the prominences of surface 11a which are not covered by layer 12a. The continuity of material across the boundary at the innermost surface of layer 13a establishes the transparency of the entire structure when the outermost surfaces of the structure are smooth.

It should be understood that the configuration of the surface 11 as shown in FIG. 2 is illustrative only and that in actual practice it can take on many forms, such as, for example, curved or jagged, uniform or non-uniform. Preferably the roughness pattern of the surface 11 should be reasonably uniform, particularly where the film is conductive and to be used as a current path to heat the structure. As will be obvious to those skilled in the art, a typical transparent metallic layer is so thin that no practical problem is encountered in conforming the layer to the contours of the surface.

The provision of the substrate 10 with the roughened surface 11 also causes diffusion of the light transmitted through the structure. To eliminate this diffusion and restore transparency to the structure, a conforming layer 13 is positioned over the layer 12 and over any other portion of the substrate 10 where the surface has been roughened. The layer 13 preferably should have an index of refraction close to that of the material of the substrate 10, and must be conformable to the rough surface of layer 12 to which it is applied, so as to restore to the structure optical transparency at visible wavelengths. The outer surface of the layer 13 is smooth and is made to conform to the desired final general configuration of the structure, usually the general configuration of the substrate in which case the outermost surface of the transparent structure are parallel; but other configurations, such as lenses, may be useful and use non-parallel outer surfaces. Various transparent plastics such as vinyls are suitable for the layer 13 as are other materials that will be obvious to those skilled in the art. Another sheet 14 of glass or clear plastic may be positioned over and laminated to the layer 13 for protection and to provide additional mechanical strength.

The laminated structure shown in FIG. 1 is provided with means for passing an electric current through the layer 12 to provide resistance heating of the panel so that defogging or deicing of the structure can be accomplished. For this purpose, bus bars 15 and 16 are positioned on opposite edges of the layer 12 and in electrical contact therewith in the conventional manner. These bus bars may, for example, be composed of silver paste deposited on the surface of the substrate 10. A pair of braided conductors 17 and 18 are electrically connected to the bus bars 15 and 16 and are passed out through the structure for connection to an external source of electrical power. As shown in FIGS. 1 and 2, the layer 12 does not extend all the way to the edge of the substrate. It could, of course, be made to do so or to cover any other desired area of the substrate. It should be understood, of course, that in many applications no electrical heating capability will be required and hence the bus bars and related electrical connections will be omitted.

FIG. 4 is a flow diagram illustrating a process by which a laminated structure according to the present invention is constructed. The structure in this particular example is useful as an infrared rejecting transparency for application in architectural glazing. With this structure as much as 80 percent of the infrared radiation transmitted by the glass can be rejected, thus reducing the radiant heating rate of the building interior. A glass plate, for example, a ⅛ inch thick plate of soda glass, is first thoroughly cleaned with methyl ethyl ketone and then isopropanol. A roughened surface is then formed on one side of the glass plate. This roughened surface can be formed by any suitable method, examples of such being grinding, chemical etching, or sandblasting. Mechanically grinding a surface of the glass plate with No. 600 aluminum oxide abrasive sold under the trademark "Alundum" has been found quite effective, as this method provides a surface of uniform roughness and of a pattern that readily accommodates the subsequent steps.

After the formation of the roughened surface is completed, the glass plate is again thoroughly cleaned with methyl ethyl ketone and then isopropanol. A thin transparent gold layer is then vacuum deposited on the roughened surface so that it follows the contours of the surface. The thickness of the gold layer may be such that it has 50 percent transmittance to visible light. The method of depositing such a layer is conventional in the art and requires no further explanation here. Normally, if a structure such as that shown in FIG. 1 is to be constructed, i.e., one suitable for electrical heating, conventional masking techniques are utilized to limit the deposition of the gold layer to the desired area of the roughened surface of the glass plate. If desired, the surface of the glass plate can be roughened only in the area where the gold layer is to be deposited. However, it is more convenient and just as satisfactory to roughen substantially the entire surface of the glass plate.

After deposition of the gold layer and the removal of any masks that were used during the deposition, a sheet of transparent, thermoplastic polyvinyl butyral of the type commonly used in automobile safety glass is positioned over the rough gold layer. This thermoplastic sheet is normally provided with textured surfaces which facilitate the lamination of smooth, rigid outer plies without the entrapment of air inclusions. The texture of the surfaces of this sheet is not to be confused with the roughness of the surfaces of the gold layer nor with the roughness of the underlying glass substrate.

A second glass plate is positioned over the thermoplastic sheet. As will be explained, this second glass plate may or may not remain as a part of the structure. In either case this second glass plate is used to support and distribute the pressure during the lamination cycle and to provide a smooth surface to which the thermoplastic sheet is made to conform. In the event that the second glass plate is not to remain a part of the structure, a suitable separation or release agent is interposed between it and the thermoplastic sheet. An example of such a separation or release agent is a 0.020 inch thick film of polytetrafluoroethylene commonly known by the trade name "Teflon" and manufactured by the E. I. DuPont DeNemours and Co., Inc. The second glass plate must have, in this case, one smooth surface, and the plate must be positioned so that this smooth surface is adjacent to the separation agent. The separation agent must be smooth. After the lamination is complete, the second glass plate and the separation or release agent are removed from the structure, leaving a laminated structure consisting of the three layers, namely (1) the roughened glass substrate, (2) the rough gold layer, and (3) the layer of thermoplastic material. The outermost surfaces of this laminated structure are both smooth, and the structure is transparent.

In the event that the second glass plate is to remain a part of the structure, the separation or release agent is omitted, and the second glass plate is positioned so that a smooth surface is remote from the thermoplastic sheet; that is, the outermost surface of the second glass plate is smooth. The lamination cycle now results in a laminated structure consisting of four layers, namely (1) the roughened glass substrate, (2) the rough gold layer, (3) the layer of thermoplastic material, and (4) the second glass plate. The outermost surface of this laminated structure are both smooth, and the structure is transparent.

It should be pointed out that this fourth layer is not essential but is sometimes preferred to provide mechanical strength or to resist abrasion.

In either the three layer or the four layer embodiment described above the lamination is accomplished by the use of heat and pressure applied to the two glass outer plates, a typical cycle being one hour at 200° F. and 200 psi. The method of providing this heat and pressure is conventional in the art and requires no further explanation here.

The nature or composition of the intermediate layer 12 which is applied to the roughened surface 11 is not to be restricted to metals, rather, the invention is useful where the layer 12 is any material such that significant reflectance of visible light occurs at its surfaces. This surface reflectance is exhibited by a variety of classes of materials; these include the well-known metals, such as gold and aluminum, metal oxides or ceramics such as stannous oxide, organic materials such as the dye fuchsin, and even non-metallic elements such as iodine crystals. In each case the reflectance of visible light is related to a difference in the magnitude of refractive indices of the layers which constitute the boundary where the reflectance occurs.

Nearly all the transparent plastics and glasses with which this invention would be used have refractive indices the magnitudes of which lie in the interval 1.3 to 1.7 for visible wavelengths. In contrast to this the layer 12 which must perform functions such as infrared rejection or electrical conduction in the completed structure in which the invention is utilized in order for the structure to be satisfactory in performance, generally has a refractive index having a magnitude considerably greater than the aforementioned interval. For example, transparent vacuum deposited gold films approximately 90 angstroms thick have a refractive index, the magnitude of which is approximately 2.8 at a wavelength of 5,500 angstroms. In almost all cases, the layer 12 will have a refractive index the magnitude of which differs from that of adjacent layers by about 25 percent or more, and this condition normally produces objectionable image reflection.

While the embodiments of the invention previously discussed have been relatively rigid, it should be understood that a flexible film of plastic or the like provided with one rough surface can be used as a substrate in the manner described above. Such a structure is shown in FIG. 5. In FIG. 5, the substrate 20 is of a thin flexible plastic material such as polyethyleneterephthalate sold under the tradename "Mylar" by E. I. Dupont de Nemours and Co., Inc. The surface of the substrate 20 is roughened and a metallic or similar layer 21 is then deposited thereon in the manner described. A conformable layer 22 of a suitable plastic material is then applied thereto. The layer 22 may be a sheet of plastic, such as polyvinylbutyral as previously described, or may be formed by applying a suitable plastic in liquid form and allowing or otherwise providing for it to set so that its inner surface conforms to the rough surface of the metallic or similar layer 21 and so that its outer surface is smooth. At any of the interfaces except that between layers 25 and 26 transparent adhesives may be used in order to provide increased interlaminar bond strength. Such a flexible laminated structure is of particular utility in applications such as retractable or rollable window shades for radiant heat control. Of course, it should be understood a liquid plastic can be used in the formation of the conformable layer in the rigid embodiments of the invention as well as in the flexible embodiments.

In FIG. 6 there is shown another embodiment of the present invention in which the laminated structure is flexible. In this embodiment, a flexible substrate 25 fabricated from Mylar or the like is provided with a roughened surface on which is deposited a metallic or similar layer 26. A conformable layer 27 is then positioned over the layer 26 and conformed to it. As shown, the layer 27 is of a clear plastic material having a textured outer surface of the type commonly provided for use as interlayers in a laminated structure. The layer 27 is thus not transparent but will become so when its outer surface is caused to be smooth by the laminating process or the like. A further plastic layer 28 with textured outer surface is laminated to the undersurface of the substrate 25. A laminated structure such as that shown in FIG. 6 has particular utility as an interior element in a laminated structure having rigid outer plies, in which case the textured outer surfaces of the layers 27 and 28 of the flexible laminate serve to enable the subsequent lamination of the smooth, rigid outer plies without the entrapment of air inclusions. Of course, the outer surfaces of the layers 27 and 28 could be smooth if desired, and the outer surfaces of the layers in the other embodiments, such as the layer 22 in FIG. 5 could be textured if such was desired and some additional processing step was contemplated to make them smooth.

It should be understood that the outer surface of the conformable layer in each of the embodiments discussed above may have the same configuration as the outer or untreated surface of the substrate or may be of some entirely different configuration. In other words, the completed laminated structure may have two outer surfaces which are parallel to form a flat panel, or the outer surfaces may follow the same curvature so as to form a curved panel, or if desired, one surface may be flat and the other curved or the surfaces may follow different curvatures so that various lens properties may be obtained.

As can be seen from the foregoing description laminated structures have been provided which have an intermediate layer of metal or the like which is capable of performing its desired function such as infrared rejection or electrical heating and yet which is constructed in such a manner that it does not specularly reflect an appreciable amount of visible light. This absence of specular visible reflectance eliminates the undesirable imaging effects which cause conventional structures to exhibit mirror-like properties. The structure still permits an undistorted view through it. Because the specular reflectivity of the structure to visible light is greatly reduced, it is useful in many applications where prior panels were found unsuitable.

I claim:

1. A laminated structure comprising a first layer, a second layer of a homogeneous thermoplastic material, an intermediate layer and a fourth layer of a homogeneous thermoplastic material, said first layer having a roughened surface, the surfaces of said intermediate layer exhibiting visible reflectance in excess of the visible reflectance of the surfaces of said first and second layers, said intermediate layer following the contours of said roughened surface of said first layer whereby visible reflections therefrom are diffused, the surface of said second layer adjacent said intermediate layer following the contours thereof, said fourth layer being adjacent said first layer, at least one of the outer surfaces of the laminated structure being textured.

2. The laminated structure of claim 1 wherein said fourth layer is optically transparent when its surface remote from said first layer is smooth.

3. The laminated structure of claim 2 wherein the surface of said second layer remote from said intermediate layer is textured.

4. A laminated structure according to claim 1 which is optically transparent when its exterior surfaces are smooth.

5. A laminated structure according to claim 4 wherein said intermediate layer is metallic.

6. A laminated structure according to claim 5 wherein said intermediate layer is electrically conductive.

7. A laminated structure according to claim 5 wherein said intermediate layer is infrared reflecting.

8. A laminated structure according to claim 4 wherein the magnitude of the refractive index of said intermediate layer is at least 25 percent greater than the refractive index of either said first or second layer.

9. A laminated structure comprising a first layer, a second layer of a homogeneous thermoplastic material, an intermediate layer and a fourth layer of a homogeneous thermoplastic material, the surfaces of said intermediate layer exhibiting visible reflectance in excess of the visible reflectance of the surfaces of said first and second layers, said first layer having a roughened surface, at least the surface of said intermediate layer adjacent said first layer following the contours of said roughened surface of said first layer and the other surface of said intermediate layer being rough whereby visible reflections from said intermediate layer are diffused, the surface of said second layer adjacent said intermediate layer following the contours of the rough surface thereof, said fourth layer being adjacent said first layer, at least one of the outermost surfaces of the laminated structure being textured.

10. A laminated structure transparent at visible wavelengths which comprises (1) a first, rigid homogeneous outer layer the outer surface of which is free of additional lamina; (2) a second, homogeneous thermoplastic layer adjacent the inner surface of said first layer; (3) a third, flexible plastic layer one surface of which is a roughened surface; (4) a fourth layer intermediate the layers (2) and (3), the surfaces of which intermediate layer exhibit visible reflectance in excess of the visible reflectance of said second and third layers, at least the surface of said intermediate layer adjacent said third layer following the contours of said roughened surface of said third layer and the other surface of said intermediate layer being rough whereby visible reflections from said intermediate layer are diffused, the surface of said second layer adjacent said intermediate layer following the contours of the rough surface thereof; (5) a fifth homogeneous thermoplastic layer adjacent to and between (a) the surface of said third layer opposite the roughened surface thereof and (b) the inner surface of (6) a sixth, rigid homogeneous outer layer the outer surface of which is free of additional lamina; each of the layers 1, 2, 3, 5 and 6 being electrically non-conductive.

11. A laminated structure according to claim 10 wherein said intermediate layer 4 is metallic.

12. A laminated structure according to claim 11 wherein said intermediate layer 4 is electrically conductive.

13. A laminated structure according to claim 11 wherein said intermediate layer 4 is infrared reflecting.

14. A laminated structure according to claim 10 wherein the magnitude of the refractive index of said intermediate layer 4 is at least 25 percent greater than the refractive index of either of layers 2 and 3.

* * * * *